United States Patent [19]

Vanderpol et al.

[11] Patent Number: 4,976,176
[45] Date of Patent: Dec. 11, 1990

[54] WELD CROWN REMOVAL MODULE

[75] Inventors: Jerald Vanderpol, Eldorado Hills; William H. Astle, Rancho Cordova, both of Calif.

[73] Assignee: Tri Tool Inc., Rancho Cordova, Calif.

[21] Appl. No.: 392,890

[22] Filed: Aug. 14, 1989

[51] Int. Cl.$^5$ ............................................. B23B 3/22
[52] U.S. Cl. ...................................... 82/113; 82/114; 82/131
[58] Field of Search ................. 82/113, 114, 128, 130, 82/131

[56] References Cited

U.S. PATENT DOCUMENTS

| | | | |
|---|---|---|---|
| 3,807,047 | 4/1974 | Sherer et al. | 82/113 |
| 3,942,248 | 3/1976 | Sherer et al. | 30/97 |
| 3,951,018 | 4/1976 | Gilmore | 82/4 C |
| 4,176,565 | 12/1979 | Christoph | 82/113 |
| 4,483,106 | 11/1984 | Wachs et al. | 51/241 S |
| 4,586,407 | 5/1986 | Nall | 82/1 C |

Primary Examiner—Frederick R. Schmidt
Assistant Examiner—Lawrence Cruz
Attorney, Agent, or Firm—Bacon & Thomas

[57] ABSTRACT

The present invention relates to a module for use with a portable lathe to machine an area of a pipe wherein a cutting tool is supported such that the orientation of its axial path of travel varies as the tool rotates around the pipe. The module feeds a cutting tool along an axial feed path that extends substantially parallel to a line connecting spaced apart reference points located on opposite sides of the area of the pipe to be machined. The orientation of this reference line varies with respect to the longitudinal axis of the pipe as the module is driven around the axis of the pipe. The mechanism to feed the cutting tool along its axial and rotational cutting paths has first and second drive shafts extending substantially perpendicular to each other. The mechanism is simplified by having a first tool support member pivotally attached to the portable lathe so as to pivot about an axis coincident with the axis of rotation of the first drive shaft. A second tool support member is pivotally attached to the first tool support member so as to pivot about an axis coincident with the rotational axis of the second drive shaft. Thus, regardless of the relative pivoting motions of the first and second tool support members, the drive shafts are always in driving engagement with each other.

10 Claims, 3 Drawing Sheets

WELD CROWN REMOVAL MODULE

BACKGROUND OF THE INVENTION

The present invention relates to a module for use with a portable lathe or the like to machine an area of a pipe to remove irregularities from the area. More specifically, the module is utilized to machine the crown of the weld attaching adjacent ends of pipes together.

It is well known in the art to fabricate pipe lines or piping systems by welding the ends of lengths of pipe together. Typically, the ends of the pipe lengths are bevelled, brought into contact with each other and welded together by running a weld bead around the bevelled end portions. As is also typical, the finished weld bead has a crown portion that extends radially outwardly beyond the peripheries of the adjacent pipe segments. It is necessary, in certain circumstances, to remove this weld crown so that the pipe ends are joined by a smooth, flat surface.

Normally, this task is accomplished by a portable lathe. Such portable lathes typically comprise a stationary power unit, having a rotatable cutting ring and a tool holder to attach a cutting tool to the cutting ring. The portable lathe is attached to one of the pipes and the cutting tool is rotated about the pipe axis and traversed along the axis to remove the weld crown.

This task becomes much more difficult when the adjacent ends of the pipe length are not precisely aligned, but are slightly offset as they are in most applications. It then becomes necessary to support the cutting tool such that the orientation of the axial path of movement changes as the tool rotates around the circumference of the pipe.

A device for supporting a cutting tool in such a fashion is disclosed in U.S. Pat. 4,586,407 to Nall, which is incorporated herein by reference. Although the device set forth in this patent works remarkably well, the device supporting the cutting tool such that its axial path of travel relative to the pipe may follow the non-aligned contours of the weld crown has proven unduly complex.

SUMMARY OF THE INVENTION

The present invention relates to a module for use with a portable lathe to machine an area of a pipe wherein a cutting tool is supported such that the orientation of its axial path of travel varies as the tool rotates around the pipe. The module is readily attachable to the rotating ring portion of a portable lathe and finds particular usage in machining the weld crown of a pipe joint.

The module feeds a cutting tool along an axial feed path that extends substantially parallel to a line connecting spaced apart reference points located on opposite sides of the area to be machined. The orientation of this reference line varies with respect to the longitudinal axis of the pipe as the module is driven around the axis of the pipe. Thus, at any given point on the rotational cutting path of the module, the tool will follow an axial path which will machine the surface of the weld to a smooth, flat surface, without removing the material of the pipe.

The mechanism to feed the cutting tool along its axial and rotational cutting paths has first and second drive shafts extending substantially perpendicular to each other. The first drive shaft may be rotated a portion of a turn for each revolution of the cutting head of the portable lathe by a known device, such as a starwheel contacting a fixed pin. Rotation of the first drive shaft causes rotation of the second drive shaft which, in turn, feeds the tool along its axial cutting path.

The mechanism according to this invention is simplified by having a first tool support member pivotally attached to the portable lathe cutting ring so as to pivot about an axis coincident with the axis of rotation of the first drive shaft. A second tool support member is pivotally attached to the first tool support member so as to pivot about an axis coincident with the rotational axis of the second drive shaft. Thus, regardless of the relative pivoting motions of the first and second tool support members, the drive shafts are always in driving engagement with each other.

DETAILED DESCRIPTION OF THE PREFERRED EMBODIMENT

Figure 1:
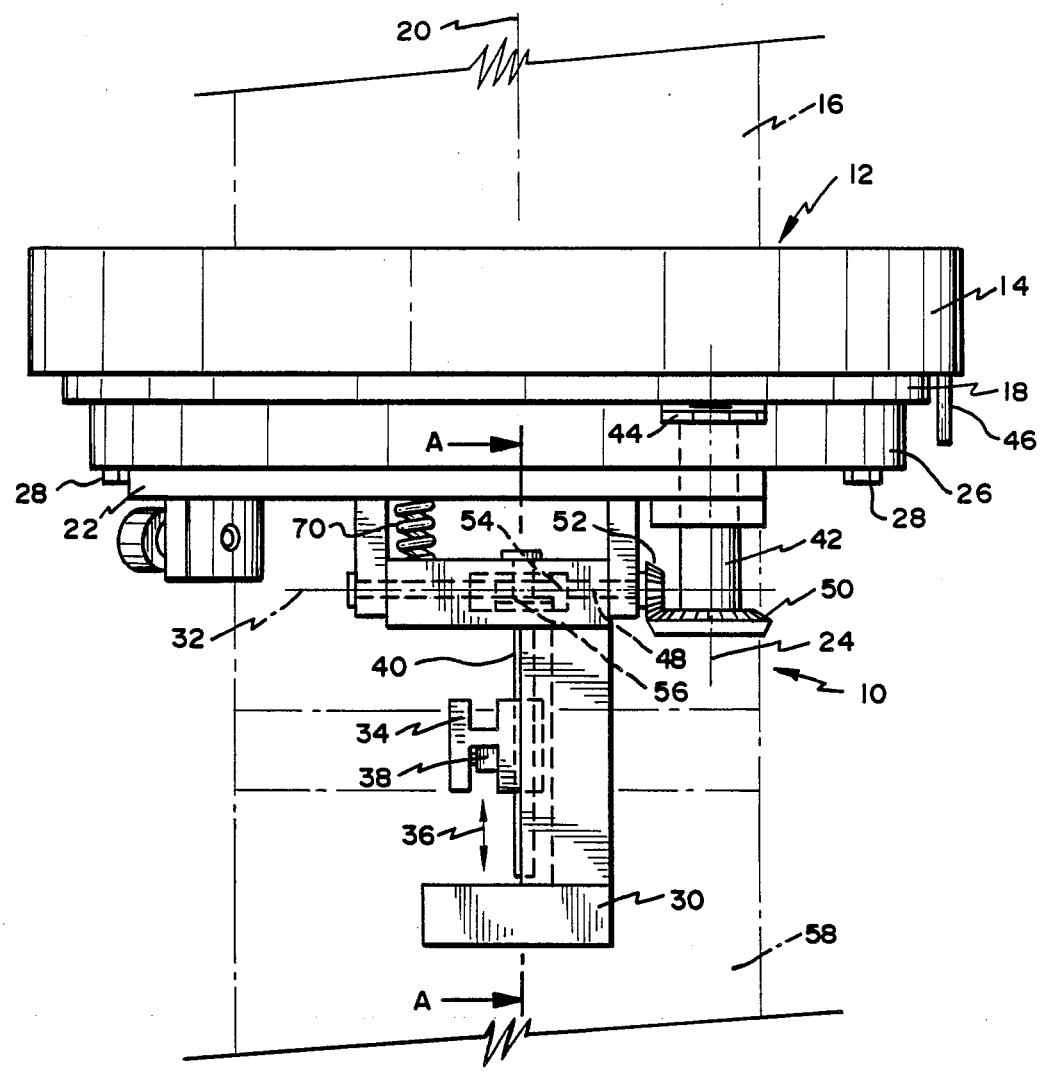
FIG. 1 is a top plan view of the module according to the invention attached to a portable lathe.
Figure 2:
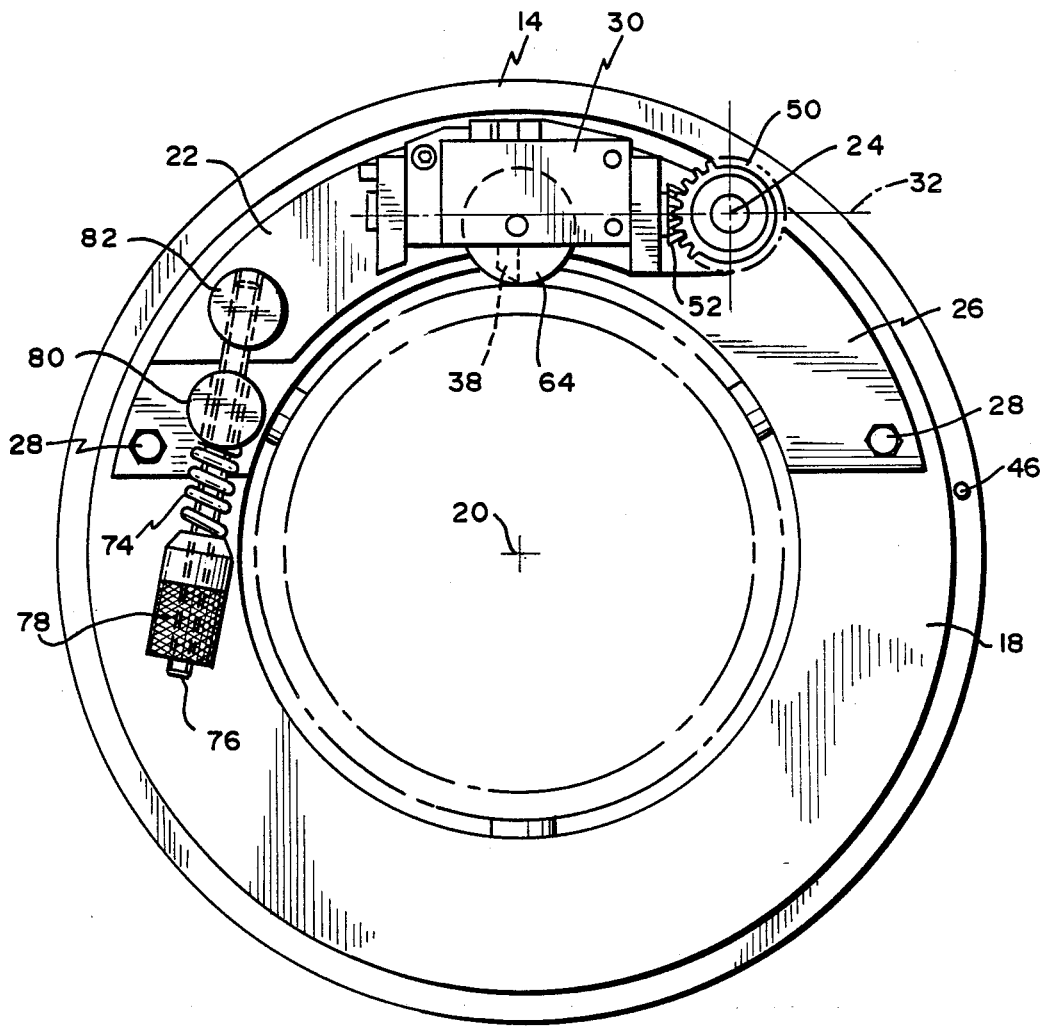
FIG. 2 is an end view of the module shown in FIG. 1.
Figure 3:
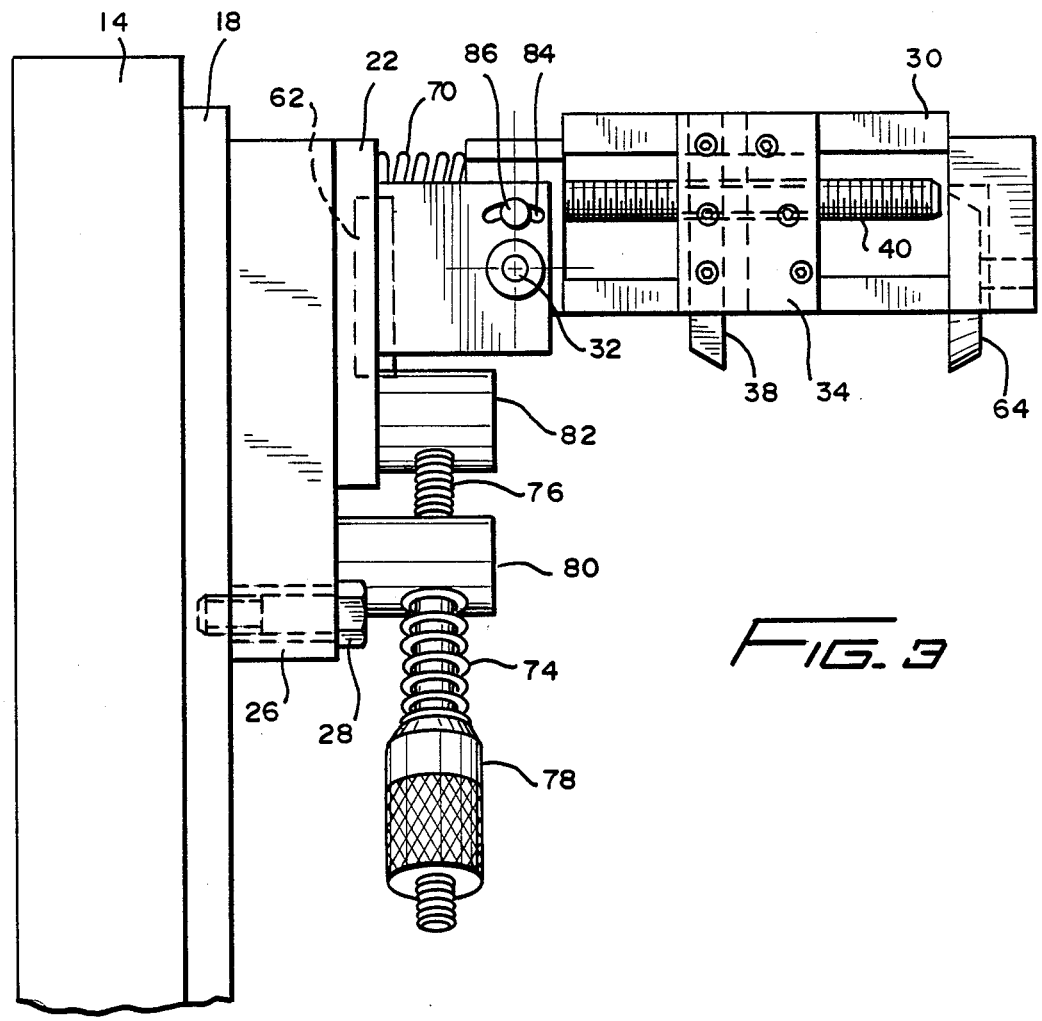
FIG. 3 is a side elevational view of the module shown in FIGS. 1 and 2.
Figure 4:
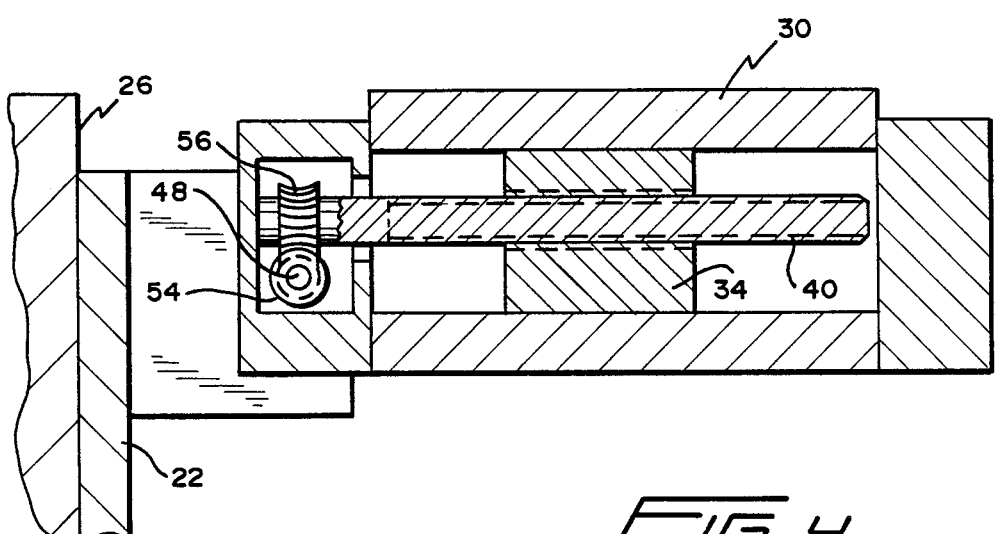
FIG. 4 is a partial, cross-sectional view taken along line A—A in FIG. 1.

The module 10 according to the invention is illustrated in FIGS. 1-3 as being attached to portable lathe assembly 12 comprising a fixed portion 14, clamped about pipe segment 16 in known fashion, and a rotatable cutting ring 18. In known fashion, ring 18 is driven by a connection with a power source (not shown) such that it may rotate about axis 20 extending generally concentrically with the longitudinal axis of pipe segment 16.

The module 10 comprises a first tool support member 22 attached to the ring 18 so as to pivot about pivot axis 24. Pivot axis 24 extends generally parallel to axis 20. Tool support member 22 may be attached to the ring 18 via attaching plate 26 which may be fastened directly to the ring 18 by bolts 28 or the like.

A second tool support member 30 is attached to the first tool support member 22 so as to pivot about axis 32. As is best seen in FIG. 1, pivot axis 32 extends substantially perpendicular to pivot axis 24. Tool support member 30 has cutting tool holder 34 slidably attached thereto such that the tool holder 34 may slide in the direction of arrows 36 in FIG. 1. Cutting tool 38 is affixed to the tool holder 34 in known fashion. Cutting tool holder 34 is driven in the direction of arrows 36 by threading engagement with feed screw 40. Feed screw 40 is rotatably mounted in second tool support member 30.

The feed means to rotate the feed screw 40 comprises a first drive shaft 42 rotatably mounted on first tool support member 22 such that its rotational axis is coincident with pivot axis 24. Shaft 42 has a star wheel 44 attached to one end thereof such that, as the ring 18 and the module 10 rotate about axis 20, the star wheel will contact fixed pin 46 to rotate the shaft 42 a portion of a revolution for each revolution of the ring 18. Fixed pin 46 may be attached to the fixed portion 14 of the portable lathe 12 or other adjacent stationary structures.

A second drive shaft 48 is rotatably mounted in the second tool support member 30 to rotate about a rotational axis coincident with pivot axis 32. Bevel gears 50 and 52, mounted on shafts 42 and 48, respectively, transmit the rotational movement of shaft 42 to shaft 48. Worm 54 (attached to second drive shaft 48) and worm gear 56 (attached to feed screw 40) transfer the rotational motion of second shaft 48 to the feed screw 40.

Thus, as can be seen, rotation of the module 10 with the cutting ring 18 will also feed the cutting tool 38 in the direction of arrows 36. Quite obviously, other driving connections may be utilized between shafts 42 and 48, and shaft 48 and feed screw 40, without exceeding the scope of this invention.

Figure 5:
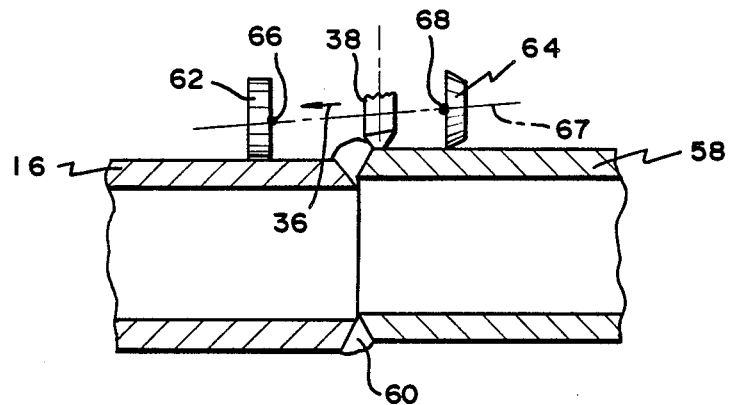
FIG. 5 is a schematic representation showing the establishment of the reference points and the cutting path of the tool.

As best illustrated in FIG. 5, pipe segments 16 and 58 have been welded together via weldment 60. However, as is very often the case in on-site welding, the pipe segments are not completely concentric, but are slightly offset with respect to each other.

The means for establishing spaced apart reference points on opposite sides of the weldment 60 comprise a first guide wheel 62 rotatably mounted on the first tool support member 22, as illustrated in FIG. 3, and a second guide wheel 64 mounted near the distal end of second tool support member 30, as illustrated in FIGS. 2 and 3. The portable lathe 12 is clamped to one of the pipe segments, in this instance pipe segment 16, such that one of the guide wheels (guide wheel 62) lies on one side of the area to be machined, while the other guide wheel (guide wheel 64) lies on the opposite side of the area to be machined. This establishes spaced apart reference points 66 and 68 which may be at the centers of wheels 62 and 64. Rotation of feed screw 40 causes tool holder 34 and cutting tool 38 to move along a path parallel to a line 67 interconnecting spaced reference points 66 and 68.

Since guide wheels 62 and 64 may move independently of each other, due to the pivoting connection between the first and second tool members, and the first tool member 22 and the ring 18, the reference line 67 connecting the spaced apart reference points 66 and 68 will continually change its orientation as the module 10 traverses around axis 20. At any given point in this rotation, the cutting tool 38 will be moving along a path parallel to the line 67 connecting the spaced-apart reference points 66 and 68 that will enable it to machine the weldment 60 to form a smooth surface interconnecting the pipe segments 16 and 58, without removing material from the pipe segments.

Spring means are provided to bias the guide wheels 62 and 64 into contact with the surfaces of the pipe segments 16 and 58 as the module 10 rotates about the segments. Spring 70 is interposed between the second tool support member 30 and the first tool support member 22 so as to urge the guide wheel 64 into contact with the pipe's surface. Spring 74 is interposed between the attaching plate 26 and the first tool support member 22 in order to urge the guide wheel 62 into contact with the pipe surface. The biasing force of spring 74 may be adjusted by placing the spring 74 around threaded member 76 between a knob member 78 and a fixed stop 80 attached to attaching plate 26. Threaded member 76 extends through the fixed stop 80 and is fixedly attached to member 82, which is, in turn, fixedly attached to the first tool support member 22. As can be seen in FIG. 2, rotation of knob 78 will move it longitudinally with respect to the threaded member 76 to thereby adjust the spring bias force between the knob 78 and the fixed stop 80. This adjusts the force with which spring 74 biases first tool support member 22 in a counter-clockwise direction about pivot axis 24, as seen in FIG. 2.

First tool support member 22 may define a curved slot 84 which slidably accommodates a set screw 86 or the like attached to second tool support member 30. Contact between screw 86 and the ends of slot 84 limits the pivoting movement of second tool support member 30 about axis 32.

The foregoing description is provided for illustrative purposes only and should not be construed as in any way limiting this invention, the scope of which is defined solely by the appended claims.

What is claimed is:

1. A module for use with a portable lathe or the like to machine an area of a pipe or tube having a longitudinal axis to remove irregularities therefrom, the portable lathe having a rotatable portion rotatable around the longitudinal axis, the module comprising:
   (a) a first tool support member attached to the rotatable portion of the portable lathe or the like such that the first tool support member pivots about a first pivot axis;
   (b) a second tool support member attached to the first tool support member so as to pivot with respect thereto about a second pivot axis substantially perpendicular to the first pivot axis;
   (c) means associated with the first and second tool support members to establish spaced apart reference points on opposite sides of the area to be machined;
   (d) means to mount a cutting tool holder on the second tool support member;
   (e) feed means associated with the cutting tool holder to move the tool holder along a path extending substantially parallel to a line connecting the spaced apart reference points; and
   (f) drive means to drive the feed means as the rotatable portion of the portable lathe rotates comprising:
      (i) a first drive means rotatable about a first rotational axis substantially coincident with the first pivot axis as the rotatable portion of the portable lathe rotates; and
      (ii) a second drive means drivingly engaged with the first drive means and the feed means, and rotatable about a second rotational axis substantially coincident with the second pivot axis.

2. The module according to claim 1 wherein the first drive means comprises:
   (a) a first shaft rotatably attached to the first tool support member so as to rotate about the first rotational axis;
   (b) a first gear mounted on the first shaft; and,
   (c) a star wheel mounted on the first shaft.

3. The module according to claim 2 wherein the second drive means comprises:
   (a) a second shaft rotatably mounted on the second tool support member so as to rotate about the second rotational axis; and,
   (b) a second gear mounted on the second shaft and drivingly engaging the first gear.

4. The module according to claim 3 wherein the first and second gears each comprise bevel gears.

5. The module according to claim 3 wherein the feed means comprises:
   (a) a feed screw rotatably mounted on the second tool support member and threadingly engaging the tool holder; and, (b) drive gear means drivingly connecting the feed screw and the second shaft such that rotation of the second shaft causes rotation of the feed screw.

6. The module according to claim 5 wherein the drive gear means comprises:
   (a) a worm attached to the second shaft; and,
   (b) a worm gear attached to the feed screw so as to engage the worm.

7. The module according to claim 1 wherein the first pivot axis and the first rotational axis extend substantially parallel to the longitudinal axis of the pipe or tube.

8. The module according to claim 1 wherein the means to establish spaced apart reference points comprises:

(a) a first guide wheel mounted on the first tool support member and adapted to bear against the pipe or tube on one side of the area to be machined; and,
(b) a second guide wheel mounted on the second tool support member and adapted to bear against the pipe or tube on an opposite side of the area to be machined.

9. The module according to claim 8 further comprising first spring means to bias the first guide wheel into contact with the pipe or tube.

10. The module according to claim 9 further comprising second spring means to bias the second guide wheel into contact with the pipe or tube.

* * * * *